United States Patent [19]
Lee

[11] Patent Number: 5,711,186
[45] Date of Patent: Jan. 27, 1998

[54] REVERSE SYNCHRONIZER MECHANISM OF MANUAL TRANSMISSION FOR A VEHICLE

[75] Inventor: Byong-Hyun Lee, Kunp'o, Rep. of Korea

[73] Assignee: Kia Motors Corporation, Seoul, Rep. of Korea

[21] Appl. No.: 697,237

[22] Filed: Aug. 21, 1996

[30] Foreign Application Priority Data

Jul. 26, 1996 [KR] Rep. of Korea ............... 96-30568

[51] Int. Cl.$^6$ ........................... F16H 3/087
[52] U.S. Cl. ........................... 74/331; 74/359
[58] Field of Search ........................... 74/331, 359

[56] References Cited

U.S. PATENT DOCUMENTS 4,667,526  5/1987  Young ........................... 74/331
4,674,346  6/1987  Hiraiwa ........................... 74/359
5,385,065  1/1995  Hofmann ........................... 74/331

*Primary Examiner*—Dirk Wright

[57] ABSTRACT

Disclosed is a reverse synchronizer mechanism for a manual transmission of a vehicle including a reverse idle drive gear rotatably mounted on a reverse idle shaft and engaging with an input first speed gear, which is integrally formed around an input shaft, to rotate therewith; a reverse idle driven gear integrally mounted on the reverse idle shaft; a reverse output gear mounted on an output shaft and engaging with the reverse idle driven gear so as to rotate therewith; and a synchronizing mechanism, which is provided between the reverse idle drive gear and the reverse idle driven gear, for synchronizing and transmitting power of the reverse idle drive gear to the reverse idle driven gear. Both the reverse idle drive gear and the reverse idle driven gear are made of helical gears.

3 Claims, 4 Drawing Sheets

REVERSE SYNCHRONIZER MECHANISM OF MANUAL TRANSMISSION FOR A VEHICLE

FIELD OF THE INVENTION

The present invention relates to a manual transmission for a vehicle and, more particularly, to a reverse synchronizer mechanism of a manual transmission having a structure which a synchronizer mechanism used for forward speed stages can be applied for a reverse speed stage also.

BACKGROUND OF THE INVENTION

Generally, a transmission installed in vehicle has an input shaft connected to an engine through a clutch, an output shaft being connected and transferring a torque of the engine, to drive wheels of vehicle, and gear trains having various gear ratios for increasing or decreasing the torque of the engine and rotation number thereof and provided between the input shaft and the output shaft, so that the torque and rotation number are varied properly by changing the gear ratios of the transmission and transferred to the drive wheels, to change speed of the vehicle in accordance with various loads. Therefore, the driver can select the torque and the rotation number of engine being transferred to the drive wheels from the engine by properly shifting a shift lever for change the gear ratios of the transmission such that the vehicle can be driven at best mode under a variety of driving conditions and loads.

In such transmission, each gear of the gear trains is slidably splined to the input shaft and the output shaft and is selectively engaged and disengaged with a synchronizer hub and a synchronizer sleeve of a synchronizer mechanism.

The synchronizer mechanism includes components such as, the synchronizer hub, the synchronizer sleeve, two blocking rings, two key springs, and three synchronizer keys, that are at different speeds one synchronized speed, and ensures that the input shaft and the speed gears mounted on the input shaft are rotating at the same speed. The synchronizer hubs are splined to the input shaft and retained therein by snap rings. The synchronizer mechanism is also to actually lock these components together. The end result of these two functions is a clash-free shift. In transmission, the synchronizer mechanism can have another important job. When the gear teeth are cut into the outer sleeve of the synchronizer mechanism, the synchronizer sleeve can act as a reverse idler gear and assist in producing the correct direction of rotation for reverse operation.

In recent transmissions, all forward gears are synchronized. One synchronizer is placed between the first and the second gears on the input shaft. Another is placed between the third and the forth gears on the input shaft. If the transmission has a fifth gear, it is also equipped with additional synchronizer. Reverse gear is not normally fitted with a synchronizer. The synchronizer mechanism requires gear rotation to do its job and reverse is selected with the vehicle at a stop.

Referring to FIG. 1 illustrating a conventional five-speed manual transmission, an input shaft 10 connected to an engine (not shown) and an output shaft 20 connected to a differential system(not shown) are disposed parallel to each other. On the input shaft 10, a first speed input gear 1, a second speed input gear 12, a third speed input gear 13, a fourth speed input gear 14, and a fifth speed input gear 15 are arranged in order, and on the output shaft 20, a first speed output gear 21, a second speed output gear 22, a third speed output gear 23, a fourth speed output gear 24, and a fifth speed output gear 25 are arranged in order. The first and the second speed input gears 11 and 12 are integrally formed with the input shaft 10, and the third, the fourth, and the fifth speed input gears 13, 14 and 15 are disposed on the input shaft 10 to be rotated thereabout. The first and the second speed output gears 21 and 22 are disposed on the output shaft 20 to be rotated thereabout, and the third, the fourth and the fifth speed output gears 23, 24 and 25 are integrally formed with the output shaft 20.

There is provided a reverse idle shaft 30 disposed parallel to the input and the output shafts 10 and 20. One end of the reverse idle shaft 30 is supported by a clutch housing 40 and the other end is supported by a transmission case 50. A reverse idle gear 31, connected with a shift selector lever (not shown), is slidably disposed on the reverse idle shaft 30. A reverse drive gear 32 for transmitting power to the reverse idle gear 31 is formed integrally with the input shaft 10, and a reverse driven gear 33 for receiving power from the reverse idle gear 31 is formed integrally with the output shaft 20. In other words, the reverse drive and driven gears 32 and 33 are arranged on a common line and designed to engage with each other, so that the reverse power is transmitted from the reverse drive gear 32 to the reverse driven gear 33 when the reverse idle gear 31 is moving along the reverse idle shaft 30. The forward gears, for which synchronized engagement is applied, are generally helical gears which have a greater strength and generate less noise in engaging, whereas the reverse gears, which are not engaged with each other by the synchronizer mechanism but by a selective sliding manner, are formed of spur gears. The synchronizers are disposed between the gears to synchronize power of the input shaft 10 with a selected speed gear.

In FIG. 2, a hub 2 of synchronizer is splined to the input or the output shaft 10 or 20. Paired input and output speed gears are slidably and rotatably mounted on the both shafts 10, 20, respectively. A inner ring 4 is rotatably and slidably mounted on the boss portion 9 of the gear 3 and, at the same time, coupled with the hub 2 to be rotatably, relative thereto. The outer circumferential surface of the inner ring 4 has a tapered-shape.

An outer ring 5 is provided on the outer circumferential surface the inner ring 4 via a synchronizer cone 6 to mate with the outer circumferential surface the inner ring 4. The inner circumferential surface of the outer ring 5 has a tapered-shape opposite to the outer circumferential surface of the synchronizer cone 6. The synchronizer cone 6 is movable in an axial direction and supported between the inner and the outer ring 4 and 5 to be rotated together with the gear 3.

A synchronizer sleeve 8 is splined to the outer circumference of the hub 2. Synchronizer keys 7 are disposed between the synchronizer sleeve 8 and the hub 2. The synchronizer keys 7 are moved by the sliding movement of the synchronizer sleeve 8 in the axial direction to push the outer ring 5, thereby frictionally engaging the outer ring 5 with the synchronizer cone 6. Consequently, this results in the frictional engagement of the synchronizer cone 6 with the inner ring 4.

In forward shift operations, before the synchronizer sleeve 8 is engaged with the spline 3a formed on an outer surface of the gear 3, the gear 3 and the synchronizer sleeve 8 are synchronized and rotated by the friction engagements of the inner ring 4 and the outer ring 5 which is splined with the synchronizer sleeve 8 by the movement of the synchronizer keys 7, with opposite sides of the synchronizer cone 6, respectively.

In a reverse shift operation, the reverse idle gear 31 shown at FIG. 1 moves along the reverse idle shaft 30 to be engaged with both the reverse drive gear 32 and the reverse driven gear 33, such that the power of the reverse drive gear 32 is transmitted to the reverse driven gear 33 via the reverse idle gear 31, thereby reversing the vehicle.

However, in the conventional reverse shift operation, since the inertia moment occurs even when the power transmission to the input shaft 10 is disconnected by a (put operated) clutch, rpm difference between the reverse drive gear 32 and the reverse driven gear 33 occurs. Therefore, when the reverse idle gear 31 which moves along the reverse idle shaft 30 is engaged with both the reverse drive gear 32 and the reverse driven gear 33, collision between the gears occurs, deteriorating the shift operation.

In addition, the reverse gears employed in the conventional manual transmission are formed of spur gears, having problems of low rigidity and creating noise.

SUMMARY OF THE INVENTION

Therefore, the present invention has been made in an effort to solve the above-described problems of the conventional manual transmission.

It is an object of the present invention to provide a reverse synchronizer mechanism for a manual transmission which can synchronize and mesh gears with each other so as to prevent collision between the gears, thereby improving the shift operation.

It is another object of the present invention to provide a reverse synchronizer mechanism for a manual transmission which can enhance the rigidity and reduce noise by using a helical gear as a reverse gear.

To achieve the above objects, the present invention provide a reverse synchronizer mechanism for a manual transmission of a vehicle, comprising a reverse idle drive gear rotatably mounted on a reverse idle shaft and engaging with an input first speed gear, which is integrally formed around an input shaft, to rotate therewith; a reverse idle driven gear integrally mounted on the reverse idle shaft; a reverse output gear mounted on an output shaft and engaging with the reverse idle driven gear so as to rotate therewith; and synchronizing means, which is provided between the reverse idle drive gear and the reverse idle driven gear, for synchronizing and transferring power of the reverse idle drive gear to the reverse idle driven gear.

Preferably, both the reverse idle drive gear and the reverse idle driven gear are helical gears.

According to a feature of the present invention, the synchronizing means comprises a hub splined to an outer circumference of the reverse idle drive gear; a synchronizer sleeve slidably splined to an outer circumference of the hub and cooperating with a shift selector lever; a reverse clutch cone integrally formed with a spline engaging with the synchronizer sleeve and carried around the reverse idle shaft; a synchronizer ring slidably mounted on an outer circumference of the reverse clutch cone; and synchronizer keys, which is disposed between the synchronizer sleeve and the hub, for pushing the synchronizer ring toward the reverse clutch cone while being moved by the synchronizer sleeve.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Preferred embodiments of the present invention will now be described in detail with reference to the accompanying drawings. Wherever possible, the same reference numbers will be used throughout the drawings to refer to the same of like parts.

Figure 1:
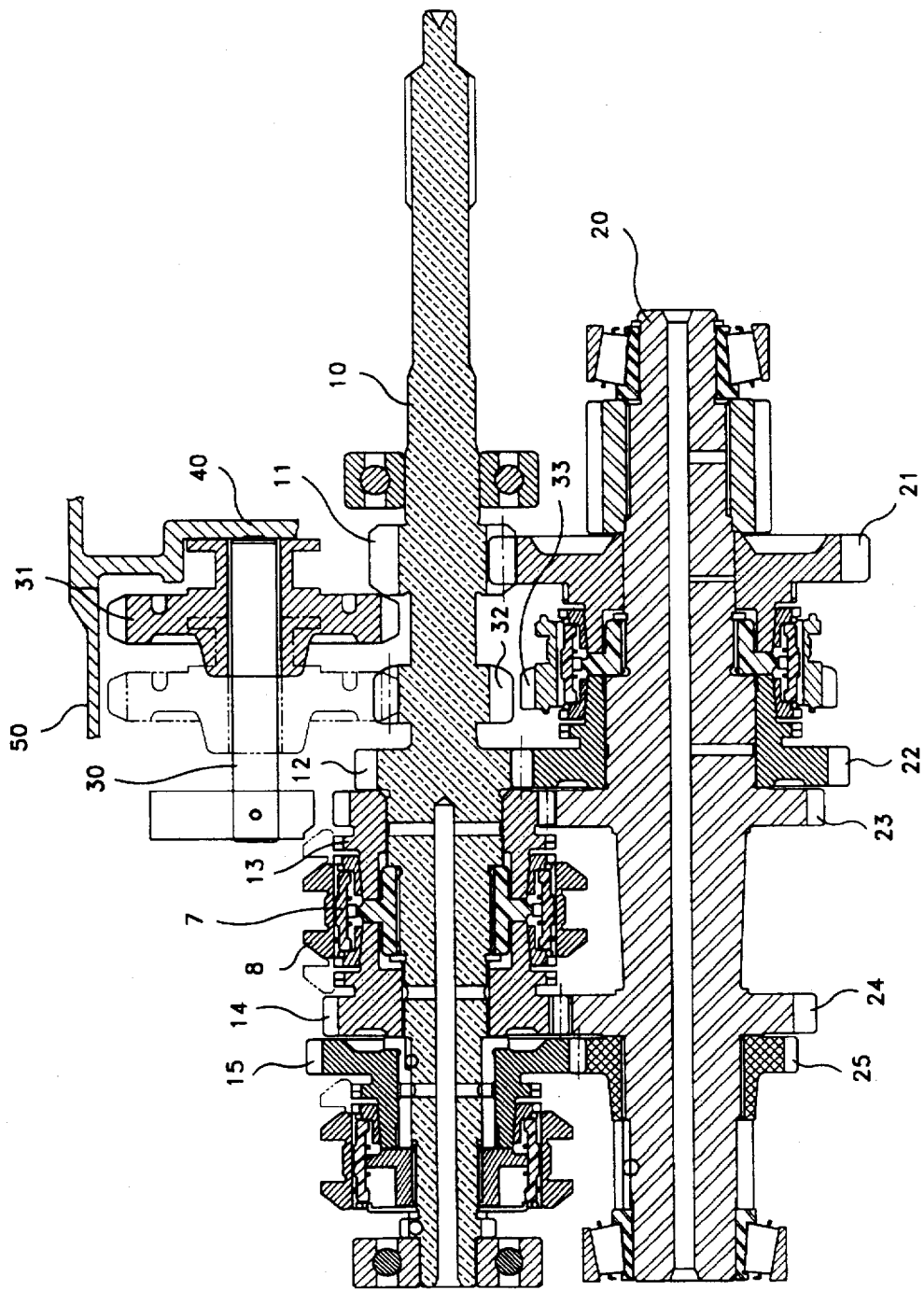
FIG. 1 is a sectional view illustrating a structure of a conventional manual transmission.
Figure 2:
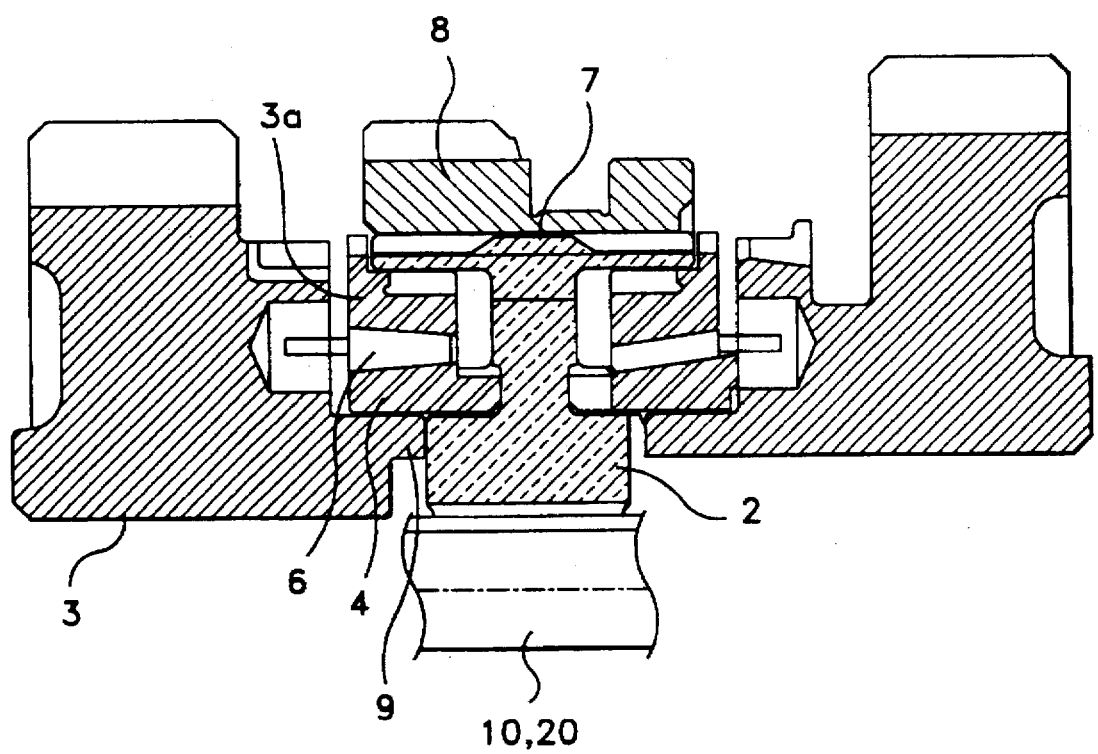
FIG. 2 is a sectional view illustrating a conventional synchronizer mechanism of the manual transmission depicted in FIG. 1.
Figure 4:
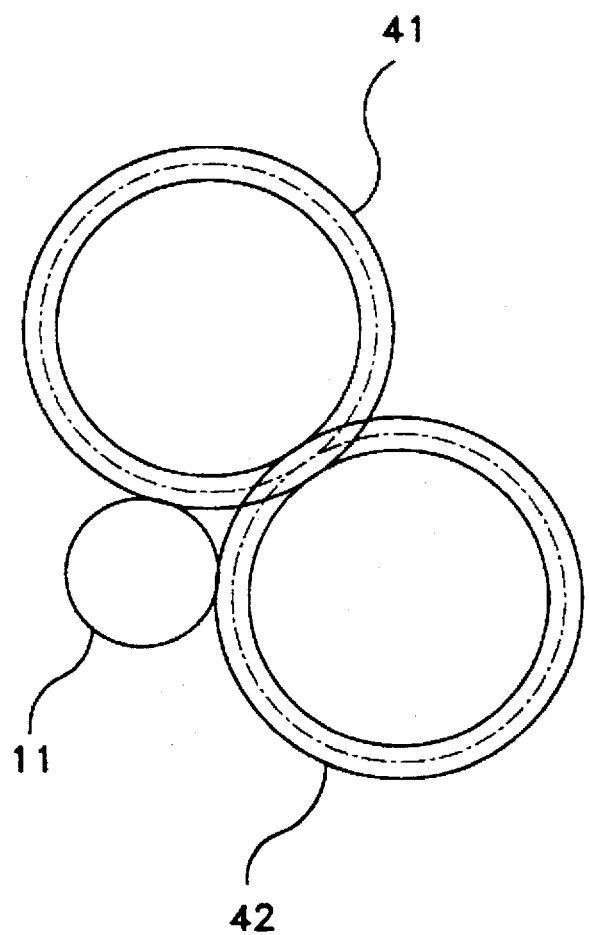
FIG. 4 is a sectional view taken along line IV—IV of FIG. 3.

Referring first to FIG. 1, a reverse idle drive gear 34 rotatably mounted around a reverse idle shaft 30 are engaged with an input first speed gear 11 which is integrally formed with an input shaft 10. A reverse idle driven gear 41 formed integrally with the reverse idle shaft 30 is engaged, as shown in FIG. 4, with a reverse output gear 42 so as to rotate therewith.

A synchronizer mechanism is provided between the reverse idle drive gear 34 and the reverse idle driven gear 41 to synchronize and transfer power from the reverse idle drive gear 34 to the reverse idle driven gear 41.

Figure 3:
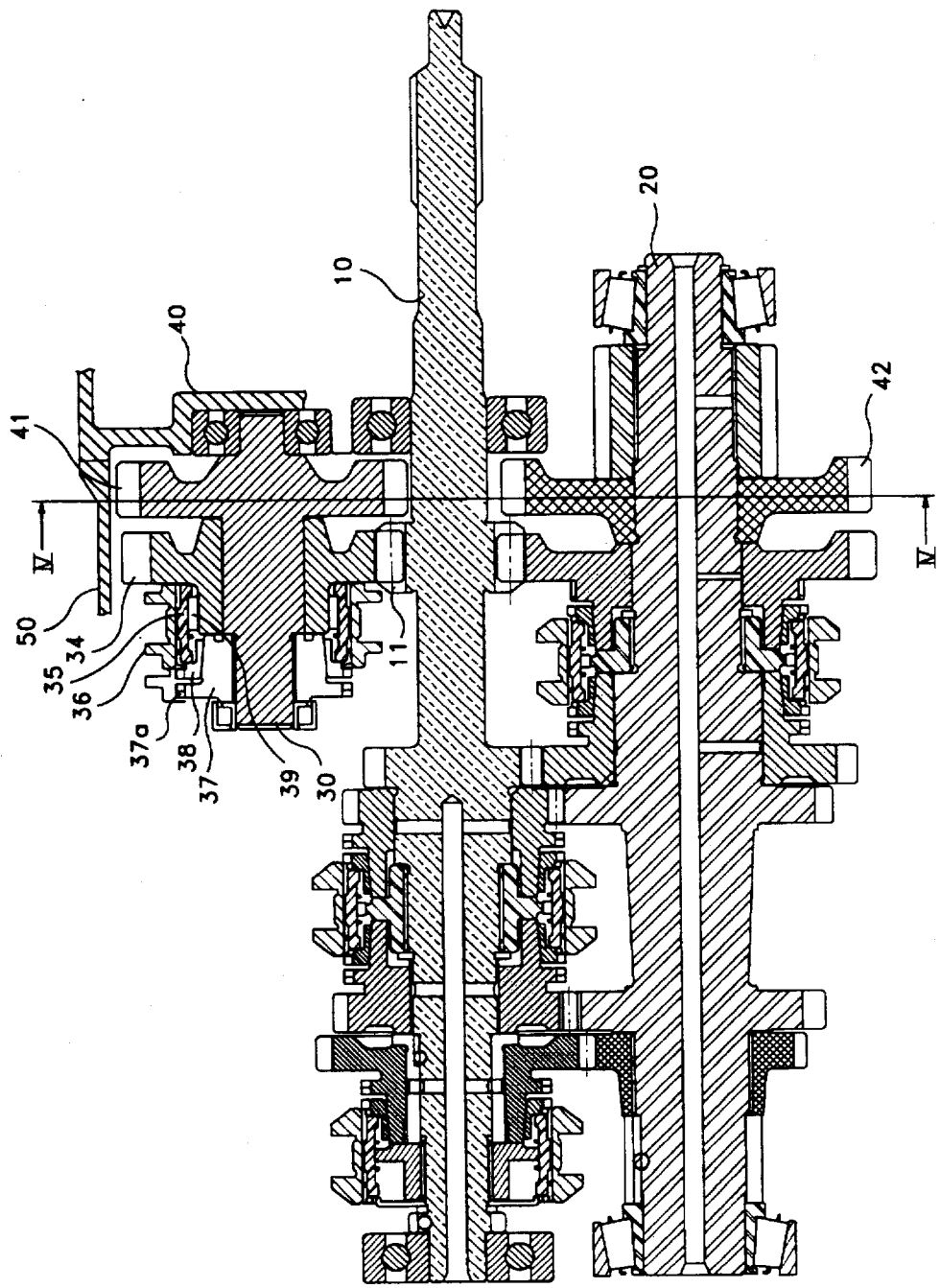
FIG. 3 is a view illustrating a reverse synchronizer mechanism of a manual transmission in accordance with a preferred embodiment of the present invention.

That is, as shown in FIG. 3, a hub 35 is splined to an outer circumference of the reverse idle drive gear 34 and a synchronizer sleeve 36 is slidably splined to an outer circumference of the hub 35. Between the synchronizer sleeve 36 and the hub 35, that is, on recesses of the hub 35, three synchronizer keys 39 are disposed at equal distances of about 120 degrees. The synchronizer keys 39 are connected to each other through key springs (not shown) to be pushed by the sleeve 36. That is, the central upper surface of the synchronizer sleeve 36 is provided with a projection such that the projection is pushed by the synchronizer sleeve 36, thereby enabling the synchronizer key 39 to be movable with the synchronizer sleeve 36.

A reverse clutch cone 37, which is integrally formed with a spline 37a engaged with the synchronizer sleeve 36, is mounted on the reverse idle shaft 30. A synchronizer ring 38, which is to be pushed toward the reverse clutch cone 37 by the synchronizer keys 39, is slidably mounted on an outer circumference of the reverse clutch cone 37. All of the reverse idle driver gear 34, the reverse idle driven gear 41, and the reverse output gear 42 are helical gears.

The reference numerals 40 and 50 which are not described above indicate a clutch housing and a transmission case, respectively.

The operation of the above-described reverse synchronizer mechanism will be described hereinafter.

Before the reverse shift operation, the reverse idle drive gear 34 comes to rotate together with the first speed input gear 11, and the reverse idle shaft 30 is fixed such that the reverse idle driven gear 41 and the reverse output gear 42 only are engaged with each other but do not rotate.

At this state, when the shift lever (not shown) is shifted to the reverse mode, the synchronizer sleeve 36 which rotates together with the hub 35 moves along the hub 35. At this point, since the projections of the synchronizer keys 39 are pushed by the synchronizer sleeve 36 such that the synchronizer keys 39 are moved together with the synchronizer sleeve 36. Therefore, the synchronizer keys 39 push the synchronizer ring 38 toward the reverse clutch cone 38 to create frictional contact, thereby gradually increasing and transferring the power of the reverse idle drive gear 34 to the reverse clutch cone 38.

By this synchronizing operation, when torque of the synchronizer sleeve 36 becomes almost the same as that of the reverse clutch cone 37, the synchronizer sleeve 36 comes to engage with the spline 37a of the reverse clutch cone 37. At this point, the synchronizer keys 39 are obstructed by the synchronizer ring 38, preventing further forward movement, and only the synchronizer sleeve 36 moves over the projections of the synchronizer keys 39, thereby engaging with the reverse clutch cone 37.

Accordingly, power is transferred to the reverse idle shaft 30 to rotate the reverse idle driven gear 41, and is then transferred to the output shaft 20 through the reverse output gear, thereby reversing the vehicle.

While the invention has been described in connection with what is presently considered to be the most practical an preferred embodiments, it is to be understood that the invention is not limited to the disclosed embodiments, but, on the contrary, it is intended to cover various modifications and equivalent arrangements included within the spirit and scope of the appended claims.

What is claimed is:

1. A reverse synchronizer mechanism for a manual transmission of a vehicle, comprising:

a reverse idle drive gear rotatably mounted on a reverse idle shaft and engaging with an input first speed gear, which is integrally formed around an input shaft, to rotate therewith;

a reverse idle driven gear integrally mounted on the reverse idle shaft;

a reverse output gear mounted on an output shaft and engaging with the reverse idle driven gear so as to rotate therewith; and synchronizing means, which is provided between the reverse idle drive gear and the reverse idle driven gear, for synchronizing and transferring power of the reverse idle drive gear to the reverse idle driven gear.

2. A reverse synchronizer mechanism according to claim 1, wherein both the reverse idle drive gear and the reverse idle driven gear are made of helical gears.

3. A reverse synchronizer mechanism according to claim 1, wherein the synchronizing means comprises:

a hub splined to an outer circumference of the reverse idle drive gear;

a synchronizer sleeve slidably splined to an outer circumference of the hub and cooperating with a shift selector lever;

a reverse clutch cone integrally formed with a spline engaging with the synchronizer sleeve and carried around the reverse idle shaft;

a synchronizer ring slidably mounted on an outer circumference of the reverse clutch cone; and synchronizer keys, which is disposed between the synchronizer sleeve and the hub, for pushing the synchronizer ring toward the reverse clutch cone while being moved by the synchronizer sleeve.

* * * * *